United States Patent [19]
Hartvigsen et al.

[11] Patent Number: 5,366,819
[45] Date of Patent: Nov. 22, 1994

[54] THERMALLY INTEGRATED REFORMER FOR SOLID OXIDE FUEL CELLS

[75] Inventors: Joseph J. Hartvigsen, Kaysville; Ashok C. Khandkar, Salt Lake City, both of Utah

[73] Assignee: Ceramatec, Inc., Salt Lake City, Utah

[21] Appl. No.: 133,444

[22] Filed: Oct. 6, 1993

[51] Int. Cl.$^5$ ............................................. H01M 8/06
[52] U.S. Cl. ..................................... 429/17; 429/19; 429/26
[58] Field of Search ................. 429/17, 19, 20, 26, 429/30, 34, 120

[56] References Cited

U.S. PATENT DOCUMENTS

| | | | |
|---|---|---|---|
| 3,488,224 | 1/1970 | Craig | 429/17 |
| 4,647,516 | 3/1987 | Matsumura et al. | 429/19 |
| 4,650,727 | 3/1987 | Vanderborgh et al. | 429/19 |
| 4,721,556 | 1/1988 | Hsu . | |
| 4,729,931 | 3/1988 | Grimble | 429/20 X |
| 4,876,163 | 10/1989 | Reichner . | |
| 4,877,693 | 10/1989 | Baker | 429/34 X |
| 4,910,100 | 3/1990 | Nakanishi et al. . | |
| 4,943,494 | 7/1990 | Riley . | |
| 4,983,471 | 1/1991 | Reichner et al. . | |
| 5,079,105 | 1/1992 | Bossel . | |
| 5,082,751 | 1/1992 | Reichner . | |
| 5,175,062 | 12/1992 | Farooque et al. | 429/20 |

OTHER PUBLICATIONS

Dokiya et al., "Train Cell Stack By Wet Fabrication Processes", IFCC The International Fuel Cell Conference, IV-B-6, pp. 309-312. (Feb. 1992).

*Primary Examiner*—Anthony Skapars
*Attorney, Agent, or Firm*—Trask, Britt & Rossa

[57] ABSTRACT

A thermally integrated reformer (10) is located inside the stack furnace (12), housing stacks (14) of solid oxide fuel cells (16). The energy to support the endothermic reformation reaction converting hydrocarbon and water feedstock into hydrogen and carbon monoxide fuel is supplied by heat recuperated from the oxidation process in the stack (14) of fuel cells (16). The source of hydrocarbons is de-sulfurized natural gas. Heat transfers to the incrementally shielded packed beds (30, 60) of the reactors (18, 19) of the reformer (10) by radiation from the stacks (14) and furnace wall (38) and by forced convection from the exhausting airflow exiting the stack furnace (12). Temperature gradients in the reformer (10) are controlled by selective (or incremented) radiation shielding (20) and by counterflow heat exchange to prevent excessive premature cracking in the reformer where carbonization would clog interstices and render the catalyst granules (32) ineffective.

28 Claims, 5 Drawing Sheets

THERMALLY INTEGRATED REFORMER FOR SOLID OXIDE FUEL CELLS

TECHNICAL FIELD

The invention relates generally to solid oxide fuel cells and particularly to reformers for breaking down hydrocarbon feedstocks into fuel for the fuel cells.

BACKGROUND ART

Fuel cells convert chemical energy in the form of chemical bond potential to electrical energy in the form of electric current. Fuel cells replace batteries in many applications, typically due to a need for a higher energy density or higher discharge rate.

Like a battery, a fuel cell converts electrochemical energy into electrical current and may use liquid electrolytes between electrodes. Like a battery, a typical fuel cell supports oxidation and reduction, but unlike a battery, they occur on opposite sides of a "selectively-permeable" barrier separating electrodes. The barrier passes only selected species, such as oxygen ions, between its two sides so that oxidation and reduction may both proceed at opposite electrodes. Like a battery, the fuel cell passes electrons released at the oxidation electrode back to the reduction electrode. The resulting current flow can be directed to an electrical load attached to the electrodes by leads.

Solid oxide fuel cells (SOFC) are a relatively recent innovation in which two porous electrodes, bonded to a solid oxide ceramic between them, form the selectively-permeable barrier. On one side of the barrier is a fuel, on the other side oxygen. Most reactants cannot pass through the barrier, but oxygen ions can flow through the solid oxide lattice. The electrodes are typically formed of electrically conductive metallic or semiconducting ceramic powders, plates or sheets which are porous to oxygen ions from the cathodic, oxygen side of the barrier.

Suitable fuels include hydrogen and simple hydrocarbons. Hydrogen was an early favorite fuels but is problematic for generation, storage, handling, and resultant cost. Simple hydrocarbons, such as methane ($CH_4$), can be used, but are preferably reformed into simpler reactants prior to entering the fuel cell to be efficiently oxidized in the fuel cell. U.S. Pat. No. 4,910,100 (Nakanishi et al.) issued Mar. 20, 1990 describes the reformation process.

As an outgrowth of the aerospace industry of recent decades, fuel cells are well documented in the art along with the preheating and reformation processes which prepare fuels for rapid reaction in solid oxide fuel cells. For example, U.S. Pat. No. 4,910,100 (Nakanishi et. al) issued Mar. 20, 1990 discusses the four most common types of fuel cells, their electrolytes and chemical reactions, and ways to increase the efficiency of reactions. Nakanishi et al. also discuss the temperatures of reformation and a method for extracting the heat of reaction to drive the reformation process within a fuel cell.

U.S. Pat. No. 4,876,163 (Reichner), issued Oct. 24, 1989, discloses various interconnected, cylindrical fuel cells arranged to uniformly distribute the temperature. U.S. Pat. No. 4,721,556 (Hsu) issued Jan. 26, 1988, discloses a stack of interconnected solid oxide fuel cells. U.S. Pat. No. 4,943,494 (Riley), issued Jul. 24, 1990, discloses a system of integrated fuel, air and exhaust conduits which support the operation of fuel cells in a compact arrangement. U.S. Pat. No. 4,983,471 (Reichner et al.), issued Jan. 8, 1991, discloses a fuel cell arrangement in which reformable fuel is exposed to a catalyst just prior to reaction in the solid oxide fuel cells. Likewise, U.S. Pat. No. 5,079,105 (Bossel), issued Jan. 7, 1992, discloses a solid oxide fuel cell in which an endothermic reformation process occurs inside the center of a stack of fuel cells as the fuel is distributed.

In the art, packed beds of granular or pelletized material having a catalyst as a surface coating are known. The packed bed may be called a reactor, reactor bed, or the like. The use of such packed beds to serve as reformers is known. The beds are effective because of the long tortuous path that exposes reactants to a large surface area of catalyst during an extended dwell time during passage through the bed.

A stack of solid oxide fuel cells operating at temperatures over 1000° C. is contained within a chamber called a stack furnace. The stack is an assembly of several fuel cells assembled in close proximity, typically sharing intermediate walls. Since the endothermic reaction of reforming a feedstock into a suitable fuel requires almost a third of the exothermic heat of combustion, heat has been recovered from stack furnaces to drive the associated reformation reactions. Transferring the recovered heat from a stack furnace to an external (remote) reformer often implies unacceptable bulk, heat losses, and temperature losses.

Some fuel cells dispense with the reformer, relying instead on anodic reformation in the stack of fuel cells itself. Anodic reformation is a process by which feedstock simply arrives in a fuel cell and reforms at the anode before oxidizing them to produce electrical current. Obviously, the presence of so many intermediate reactions and species at the anode creates an access problem. An "atomic or molecular traffic jam" occurs as atoms try to reach proper reaction sites with the requisite energy. All reactions slow. Of course, the rate-limiting reaction in the chain of reactions occurring during the process may be as severely affected as any other. The resulting inefficiency of this overall process detracts from the mechanical simplicity of the scheme.

Internal reformers placed directly inside the stack furnace recover the heat and temperature losses experienced by remote reformers without burdening the fuel cells' anodes with the reformation duty. However, such placement is not without problems. For example, in the temperature range of reformers in the stack furnace, the formation of elemental carbon is rapid, even overwhelming.

The cracking process, which dissociates the constituent atoms of carbon and hydrogen from methane, is temperature sensitive. At the same time, little energy is required to break the interatomic bonds. Thus, the cracking process converting methane to elemental carbon can occur very rapidly with minimal energy so long as a high temperature is maintained in the feedstock. In an internal reformer, such a condition exists inherently.

Carbon coats and damages catalytic surfaces and clogs interstices within the reactor bed of the reformer. Agglomerated elemental carbon does not react as readily as individual atoms in the flow through the reformer. Therefore, both effects tend to be irreversible, rendering much of the catalytic surface inaccessible, useless or both.

The reformation process, properly controlled, is a balancing act to keep the multiple reactions operating at a point close to thermodynamic equilibrium. No individual reaction, such as carbon formation, should be permitted to get out of control. Thermodynamic equilibrium is maintained by controlling the species present, the temperature of the flow, and the heat flux into the flow. The need for thermodynamic equilibrium is largely dependent on the cracking process which tends to form elemental carbon. That reaction, with the corresponding dissociation of the constituent atoms in water, is balanced against the twin formation processes creating carbon dioxide and hydrogen.

While cracking occurs rapidly, the recombination of the atomic constituents of steam and hydrocarbons into fuel does not. Carbon monoxide and hydrogen form slowly, limited by the rate-limiting reactions of the reformation process. Formation of carbon monoxide and hydrogen fuel also requires the majority of the energy of reformation. In addition, the steam constituent in the feedstock absorbs energy during dissociation. Also, the formation of carbon monoxide and hydrogen is not augmented so much by temperatures elevated above a minimum value as it is by dwell time. Access time is required to allow free atoms to find sites for recombination.

Of course, as a reaction begins at one end of a long reformer, the feedstock will be rich in unreformed hydrocarbons. Therefore, in light of the ease of cracking, too-high temperatures are particularly onerous, while site availability for recombination is low. Thus, the minimum temperature suitable for recombination should not be exceeded or the reformation and indeed the reformer may be overwhelmed by cracking.

Likewise, toward the end of a long reformer, the flow will be rich in fuel, and elevated temperatures may be helpful to increase the vigor of the reaction of the little remaining feedstock. Particularly since reaction sites are more widely dispersed, a high atomic collision rate is needed to drive the reaction rates of reformation. Likewise, with little feedstock remaining, carbonization of the catalyst in the reactor bed is less likely to be a problem.

An ideal reformer will maintain the temperature, heat flux and species concentrations at values which maintain the desired thermodynamic equilibrium. Thus, what is needed for an internal reformer is a system for distributing the temperature along the flow path of the feedstock in the reactor bed of a reformer. Heat transfer should be managed to provide adequate energy as heat flux to the endothermic processes at a temperature which is appropriate to the reaction kinetics, flow rate and dwell time. Such a system should prevent carbonization in feedstock-rich portions of the flow path. It should also ensure that reformation is as nearly complete as possible at the end of the flow path. That is, it should maximize reformation while minimizing carbonization due to excessive early cracking. It should match species concentrations, heat transfer and temperature throughout, yielding a smoothly declining feedstock-to-fuel ratio. Reaction sites for forming fuel will at first be plentiful, then dispersed, as the feedstock represents a decreasing fraction of the fluid stream in the reformer. Conversion rates approaching 100 percent should be achieved with no carbon build-up in reformers of commercially reasonable size.

DISCLOSURE OF INVENTION

The invention meets these needs by the use of a radiation-shielded, counterflow, thermally integrated reformer in the stack furnace. The reformer is located in the stack furnace, exposed to the forced convection of exhaust gases and the radiation of the stack of fuel cells and the furnace walls. However, portions of the reformer are shielded to differing degrees from radiation in order to provide graduated temperature and limited heat transfer. Meanwhile, the reformer employs counterflow heat exchange from downstream flows rich in hot fuel to upstream flows rich in the cooler feedstock.

The invention includes a thermally integrated reformer having a reactor bed positioned in the reformer for reacting a feedstock to a fuel, an inlet for conducting the feedstock into the reformer, apparatus for exchanging heat between a solid oxide fuel cell and the feedstock at a rate proportional to the rate of formation of the fuel, and an outlet positioned to receive the fuel from the reactor bed for conducting the fuel to the solid oxide fuel cell. The reformer includes apparatus for controlling the temperature of the feedstock in the reformer to minimize formation of elemental carbon.

A heat exchanging apparatus is positioned to transfer heat from the stack and a wall of the stack furnace to the reactor bed. The heat exchanging apparatus includes apparatus for transferring heat from the stack by radiation and apparatus for transferring heat by forced convection. Forced convection occurs by flowing exhausting air from the stack over the reactor beds of the reformer. It also occurs in counterflow as the exhausting air is vented from the stack furnace to ambient. The wall of the stack furnace contains a corrugated counterflow heat exchanger that recuperates the heat in exhausting air into incoming air directed to the stacks.

The heat exchanging apparatus includes apparatus for shielding a portion of the reactor bed from radiation. The shielding apparatus is graduated along the fluid flow path for maintaining a thermal gradient along a length of the flow path through the reactor bed. The shielding apparatus can be satisfactorily graduated if done in at least three stages. The reformer located in the plenum of the stack furnace is thus exposed to radiation from the stack and the wall of the stack furnace in graduated stages.

Feedstock passes through the reformer by counterflow. Feedstock passes into an inlet of the reformer and through a bed of catalytic particles or granules, called a packed bed or a reactor bed, designed to contact the feedstock along the length of the bed through a tortuous path. The bed may be multiple beds which may operate in series. The heat transfer and temperature are higher at the closed end than at the end where the inlet and outlet of the bed are positioned. The flow then reverses at the closed end of the bed, flowing down a central tube extending back through the bed along almost the entire length of the bed to the outlet. The exiting flow thus exchanges heat with the incoming flow. These flow directions result in a counterflow heat exchanger within the bed. A recuperative counterflow heat exchange process in the fuel flow path helps to establish and regulate a temperature gradient throughout.

At the inside wall of the stack furnace, a counterflow heat exchanger employs a corrugated fin captured between two layers or walls of high temperature sheet metal. To recover the exhaust heat from the furnace, exiting air passes through outgoing channels formed by the continuous fin and one sheet metal wall. Incoming air passes in counterflow through channels along the opposite sheet metal wall on the opposite side of the fin, thereafter discharging into the fuel cell. Thus, the entire airflow, from its inlet through the walls of the stack furnace, through the stack or stacks, to the plenum of the stack furnace, through the walls of the stack furnace again to the exit, is a recuperative counterflow convective heat transfer process.

By recuperating heat from exiting flows into incoming flows, flowing in opposite directions, each convective heat exchanger is a recuperative counterflow heat exchanger. The system is also recuperative because it recuperates the otherwise lost heat of reaction from the fuel cells, transferring it back into the stack furnace to heat the stacks and the reformer. The convection is forced because both the feedstock or fuel flow path and the airflow path are driven by pumps.

Other counterflows also exist. The forced convection may move in counterflow over the beds of the reformer. However, radiation coupling is so dominant, that such is not necessary. Although the flow of exhaust fluids from the fuel cells can pass in true counterflow over the beds, sometimes referred to as modules, the radiation shielding gives a counterflow effect by graduating the temperature along the beds. Likewise, radiation heat transfer from the stacks to the walls of the finned, corrugated heat exchanger is recuperated by the incoming air.

Several reactor beds may be connected in series, each with a different shielding arrangement to promote a graduated temperature along the entire flow path through the series. Satisfactory results are possible with two beds in series. A larger number of beds (modules), with their associated apparatus, may be effectively connected in series. The heat exchanging processes and separation or flow streams necessitate a container surrounding the reactor bed for containing the catalytic particles and the flow of feedstock. The container is a good conductor of heat and must maintain its mechanical integrity near 1000° C.

The feedstock is a combination of steam and hydrocarbons passing through a reformer employing a reactor bed positioned within the plenum of a stack furnace surrounding a stack of solid oxide fuel cells. The entire apparatus comprises a stack of fuel cells for generating electricity from oxidizing fuel, a stack furnace surrounding the fuel cell for containing the heat and fully combusting the fuel into exhaust, a corrugated-fin-type counterflow heat exchanger positioned at the wall of the stack furnace for recuperating heat from the exiting air stream into the incoming air stream and a reformer positioned to receive heat from the stacks and walls of the furnace for providing heat to reform the feedstock into fuel to be fed into the fuel cells.

The fuel cell includes a cathode for forming and passing oxygen ions. An anode is spaced apart from the cathode for reacting hydrogen and carbon monoxide with oxygen ions. A solid oxide electrolyte is positioned between these electrodes, and in intimate contact with both the anode and the cathode for passing oxygen ions from the cathode to the anode. Leads between these electrodes pass electrons from the anode to the cathode for forming oxygen ions.

The reformer includes a packed bed positioned to receive the feedstock and to receive heat from the stack furnace for reforming the feedstock into fuel. The packed bed includes a catalyst for enhancing the reformation of the feedstock into fuel. The reformer and stack furnace include integral apparatus for exchanging heat between the air exhaust and the feedstock, between the air exhaust and incoming air, between the stacks and the incoming air, and between the stacks and the feedstock. The heat exchanging apparatus is thus all positioned within the stack furnace and includes the stack, the wall of the stack furnace, the container or enclosure of the packed bed, and the granules of the packed bed as part of the mechanism to transfer heat to the fluids entering the stack and the reformer. The apparatus for heat exchange is completely integrated.

Air exhausted from the stack passes into the plenum of the stack furnace. The wall of the stack furnace is formed by a corrugated-fin-type counterflow heat exchanger for receiving air from the plenum. Incoming air to be reacted in the stack first flows through the corrugated fin heat exchanger, separated from exhausting air by only the thin corrugated metal fin. Heat from the airflow exhausted from the plenum of the stack furnace thus transfers into the airflow being inducted into the fuel cell stack.

Heat transferred by radiation from the stacks to the furnace walls is partially re-radiated back into the furnace. The heat is partially convected by the corrugated fin heat exchanger into the airflows. The heat exchanging apparatus actually includes the outlet tube passing through the packed bed and the catalytic granules for conducting heat to fluid passing through the packed bed.

Radiation shielding prevents the packed beds of the reformers from "viewing" the stack and the furnace walls. The counterflow operation of the packed beds and the radiation shielding combine for graduating the temperature distribution along the length of the packed bed. Likewise, placed in series, with appropriate shielding, a plurality of packed beds maintain a graduated temperature distribution along the entire flow path through the reformer.

The invention also includes a method of using the apparatus for reforming a hydrocarbon and steam feedstock into a fuel of carbon monoxide and hydrogen. The method includes introducing a feedstock into a reactor, exposing the reactor to exhaust from a fuel cell, extracting heat from the exhaust into the reactor, adding heat to the feedstock in the reactor, reforming the feedstock into fuel, and passing the fuel into the fuel cell. The method also introduces heat into incoming air in a heat exchanger, then directs the air into the fuel cell where it is partially consumed, the remainder picking up heat from the fuel cell. Air exiting the fuel cell is directed through the heat exchanger, transferring heat to the incoming air.

The method includes introducing a flow of feedstock into a reactor positioned inside a stack furnace housing a solid oxide fuel cell, exposing the reactor to radiation and exhaust from the fuel cell and stack furnace. Heat from the stack of fuel cells and from the stack furnace is transferred into the flow, providing energy for reforming the feedstock into fuel. Heat from the downstream flow is transferred into the flow. The fuel is then directed to the fuel cell.

The method also includes establishing a temperature gradient along the length of the reactor by selectively shielding portions of the reactor from the radiation. The method may also introduce the flow into the reactor at a controlled flow rate. Heat is added to the flow at a rate proportional to the rate of the flow for maintaining thermodynamic equilibrium. The method exposes the feedstock to a catalyst in the reactor. The feedstock typically includes a mixture of a hydrocarbon and water. Methane and natural gas, and vaporized diesel and aviation fuels are suitable hydrocarbons for reformation into a fuel of carbon monoxide and hydrogen.

As used herein, a "reactor" is a bounded region wherein a chemical reaction is fostered. A packed bed type of reactor includes a packing material capable of conducting heat from the walls of the reactor bed into the interior. Typical packing materials in the packed bed include granules of ceramic coated with catalyst. The heat is convected and conducted between the packing material and reactants passing through the reactor bed.

A "shield" or "shielding" is any apparatus which prevents "viewing" of one radiation heat transfer surface by another. A single layer of material opaque to the radiation wavelengths of interest acts as a shield. Multiple layers are sometimes employed so that a heated shield cannot effectively re-radiate, since it cannot directly view or be viewed by one of the surfaces. Also, any material which is opaque to a radiation spectrum of interest forms a shield. In some instances, a shield may include an insulating material to inhibit re-radiation from the side opposite the principal receiving surface.

A "thermal gradient" is a temperature distribution along a direction, particularly a direction of flow of a heated fluid. Such a temperature gradient is important in counterflow heat exchangers to improve the efficiency of heat transfer. Near the exit of the heat exchanger, the driving temperature of the fluid being cooled is higher than near the inlet, tending to match the gradient in the fluid being heated between the same points. Thus, a substantial temperature differential exists between the driving temperature of the heat source and the temperature of the fluid being heated throughout the entire flow path from inlet to exit.

A thermal gradient is important in the device of the invention to assure that the hydrocarbon reactants reform completely to the desired fuel without depositing elemental carbon in the reactor bed. The rate of breakdown of the hydrocarbon reactants in the feedstock to carbon is relatively rapid. The carbon will be relatively easily formed, but carbon monoxide formation and hydrogen formation occur more slowly. Allowing too high a reaction rate creates carbon faster than it can be reformed into carbon monoxide. Unreacted carbon is of no use, fouling the catalytic surfaces and restricting flow through the interstices in the reactor bed. To prevent a buildup of carbon while obtaining maximum conversion rates of reactants into intermediate products, the temperature gradient along the outside surface of the reactor bed is maintained by shielding against radiation head transfer. In this way, approximate chemical equilibrium is maintained between the reactants and the intermediate products along the length of the reactor bed. In short, the constituent species and their dwell time in the reactor bed are matched against the heat transfer rate, temperature and the reaction kinetics of the reactions occurring in order to maintain thermodynamic equilibrium throughout the reformer.

Graduated shielding meets the requirement for creating a thermal gradient since radiation heat transfer is such a dominant process. Thus, the necessary heat of formation is added to the reactants at a rate corresponding to the flow rate of reactants. This implies a rate at which heat can be effectively used without fouling the reactor bed. In the system, the reaction kinetics of the slowest reaction are accommodated by slowing the faster reactions using temperature gradient control and heat flux control.

The arrangement of a flow path must conduct the flow of feedstock into the reformer and through the reformer as the feedstock reacts, converting the flow predominantly into fuel. Counterflow means that a flow path is arranged so that the flow continually transfers heat from itself at a downstream position in the flow path to itself at an upstream position in the flow path. For example, in one embodiment, the incoming flow of feedstock is exposed to heat from a catalytic bed heated by conduction and convection from the walls of its own surrounding container. Heat transfers to the wall of the container by radiation and forced convection inside the stack furnace during the first half of the flow path through the reactor bed. Meanwhile, the exiting flow, dominated by reformed fuel, passes in an opposite direction through the reactor bed by way of a central conduit where it may still continue to reform into fuel as it transfers heat back to the reactor bed.

Also, as discussed, the corrugated-fin-type heat exchanger that forms the inner wall of the stack furnace transfers heat from exhausting air to incoming air upstream in the same flow. As air passes out of the stack furnace, it transfers heat to air coming in from an opposite direction. The air thus pre-heated is then directed into the fuel cell to support oxidation.

The invention also includes methods of manufacturing the reformer and fuel cell assemblies incorporating such reformers.

BRIEF DESCRIPTION OF DRAWINGS

In the drawings, which depict presently preferred embodiments of the invention and in which like reference numerals refer to like parts in different views.

BEST MODE FOR CARRYING OUT THE INVENTION

Figure 1:
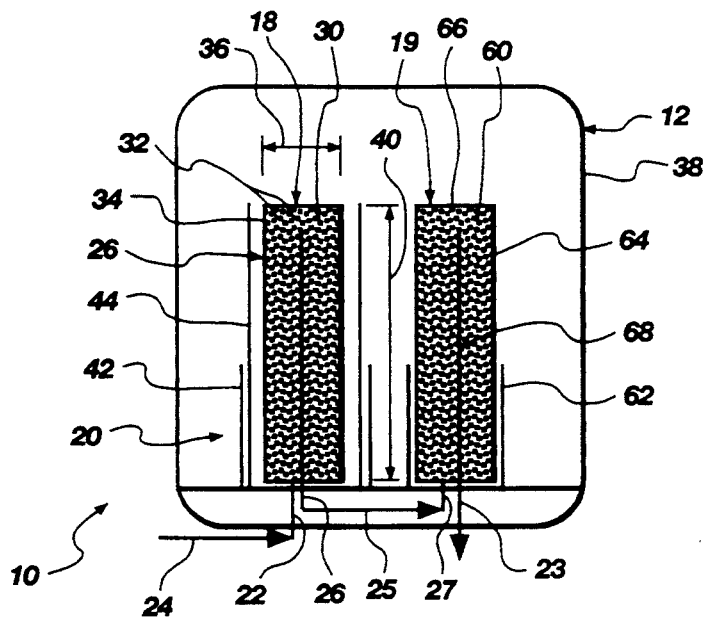
FIG. 1 shows a schematic elevation view of the thermally integrated reformer of the invention.
Figure 2:
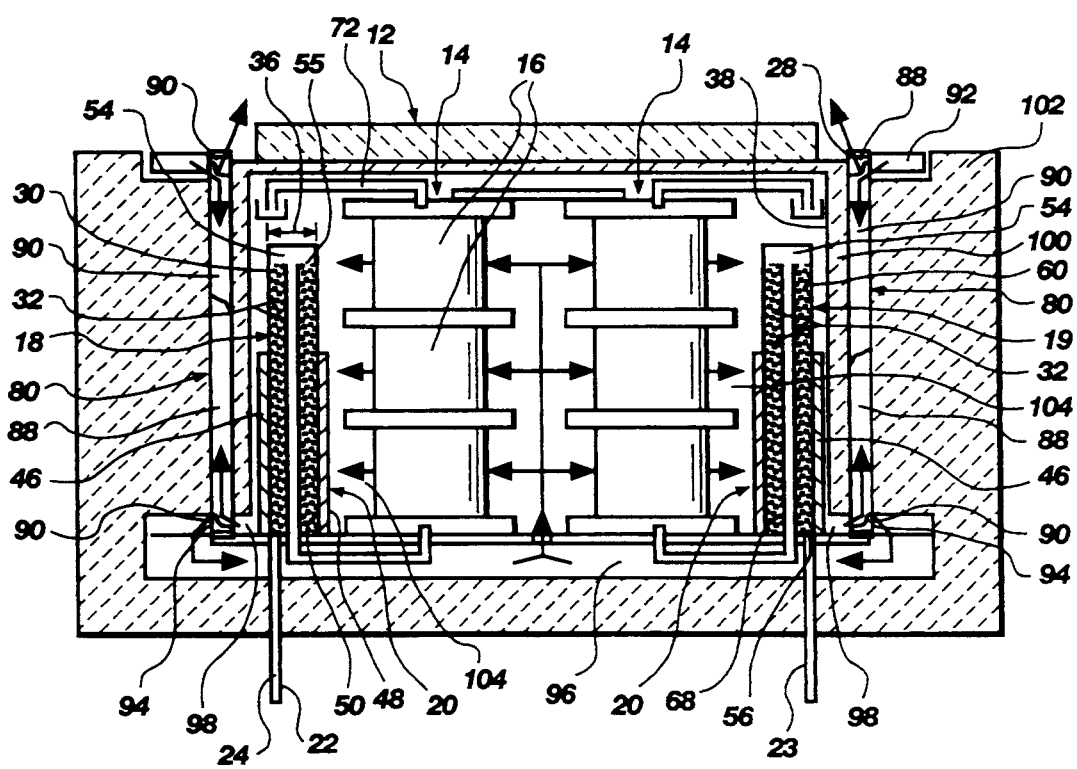
FIG. 2 shows a schematic elevation view of a stack furnace containing stacks of fuel cells and thermally integrated reformers of the invention.

The invention is best understood by reference to FIGS. 1 and 2 which show a reformer generally 10 that is implemented by inclusion within a furnace 12, also called a stack furnace, surrounding a stack 14 of individual fuel cells 16. The reactors 18, 19 generally form the principal part of the reformer 10, and are partially shielded from radiation by a shield system 20.

FIG. 2 shows an arrangement of the contents of the stack furnace 12 configured to obtain the benefits of the invention. It is understood that a flow may be of energy or mass, any mass flow may be a mixture of constituents, a fluid may be a liquid or a gas, and energy flowing by virtue of a temperature differential is heat.

The reformer 10 is best understood by following the flows of mass and energy through it. An inlet 22 introduces a flow of feedstock 24 into a first reactor 18. The flow will later pass into a second reactor 19 and out through an outlet 23. The feedstock 24 passing in through the inlet 22 preferably contains water vapor (steam) mixed with a hydrocarbon, such as desulphurized natural gas whose principal component is methane. The paths through the reactors 18, 19 are joined by a line 25 connecting an outlet 26 of the reactor 18 to the inlet 27 of the reactor 19. The feedstock 24 is preferably preheated in a remote heat exchanger (not shown) which recovers thermal energy from combusted fuel or the hot air discharged by the air exhaust line 28 exiting the stack furnace 12. After such preheating, the feedstock typically enters the first reactor 18 at a temperature of approximately one hundred fifty (150) degrees celsius.

The flow passes through a packed bed 30 comprised of pellets or granules 32 having a catalytic coating (e.g. nickel, ruthenium). The packed bed 30 transfers heat from the container wall 34 to the flow by a combination of conduction and convection. The container wall 34 is preferably cylindrical, having an inside diameter 36 of from about two (2) centimeters to about ten (10) centimeters and preferably about five (5) centimeters, and receives heat by radiation and convection from the stacks 14 and from the furnace wall 38. Radiation is not absent inside the packed bed 30, but is not of the order of magnitude of conduction and convection. However, radiation is the most significant mechanism for transferring heat from stacks 14 and furnace walls 38 to the container walls 34 of the reactors, 18, 19. From the container walls 34, heat is conducted into the granules 32 which present a tortuous path for conducted heat. Heat is also transferred by convection as the feedstock 24 picks up heat from the container wall 34 and granules 32 and distributes it among the other granules 32 and other fluids in the flow in passing.

The flow passes from the inlet 22 of the first reactor 18 along the length 40 of the packed bed 30 through the granules 32, a distance of from five (5) to fifty (50) centimeters, but preferably approximately thirty (30) centimeters. For the first half of the length 40 of the packed bed 30, the container wall 34 is shielded as shown in FIGS. 1 and 2, and preferably as shown in FIG. 1.

The furnace wall 38 and stack 14 with the airflow they enclose create an environment at approximately 900 degrees Celsius. The outer shield 42 intercepts radiation from the furnace wall 38 and from the stack 14 and heats up to an intermediate temperature. Outer shield 42 then re-radiates to the inner shield 44, which in turn re-radiates to the container wall 34. The resistance to radiation heat transfer provided by the outer and inner shields 42, 44 is substantial. This resistance greatly reduces heat transfer and limits the temperature rise in the container wall 34 of the packed bed 30 to approximately 430 degrees Celsius. In the alternate embodiment of FIG. 3, the outer shield and 42 inner a portion of the shield 44, are replaced by an insulated shield 46 which intercepts radiation at its outer surface 48, but insulates against re-radiation by its inner surface 50. Such an arrangement results in a region which is almost adiabatic near the inlet 22 of the packed bed 30.

As the flow passes through the packed bed 30, it begins cracking at a rate controlled by the temperature in the packed bed 30. Reformation progresses at a rate controlled principally by the rate of heat transfer into the flow, the temperature, the species present and their reaction kinetics to maintain approximate thermodynamic equilibrium. For example, the flow of heat to support the endothermic reactions of reformation is balanced against the flow rate to limit cracking the feedstock 24 at a corresponding rate.

As the flow passes through the second half of the packed bed 30, only the inner shield 44 operates to limit radiation to the container wall 34. As a results, the temperature of the container wall 34 at the top of the packed bed 30 is approximately 695 degrees Celsius. Of course, no homogeneous material will support a step change in temperature distribution, so the temperature of the container wall 34 is approximately 503 degrees Celsius where the outer shield 42 stops and the inner shield 44 continues. The same effect can be achieved whether construction relies on double shielding or insulated shielding methods.

At the top of the packed bed 30, the flow collects into a return pipe 52, and may be aided by a plenum 54 as shown in FIG. 2. The inside diameter 53 of the return pipe 52 typically varies from three (3) millimeters to three (3) centimeters depending on the installation and is preferably one (1) centimeter. As the flow passes into the return pipe 52 toward the outlet 55, the flow has been exposed to the highest temperature experienced in the packed bed 30. As the flow courses toward the outlet 54, it passes through portions of the packed bed 30 which are at lower temperatures. The result of this counterflow through the packed bed 30 is heat transfer from the flow in the return pipe 52 to the packed bed 30, further contributing to the establishment of a smooth temperature gradient along the length 40 of the packed bed 30.

Figure 3:
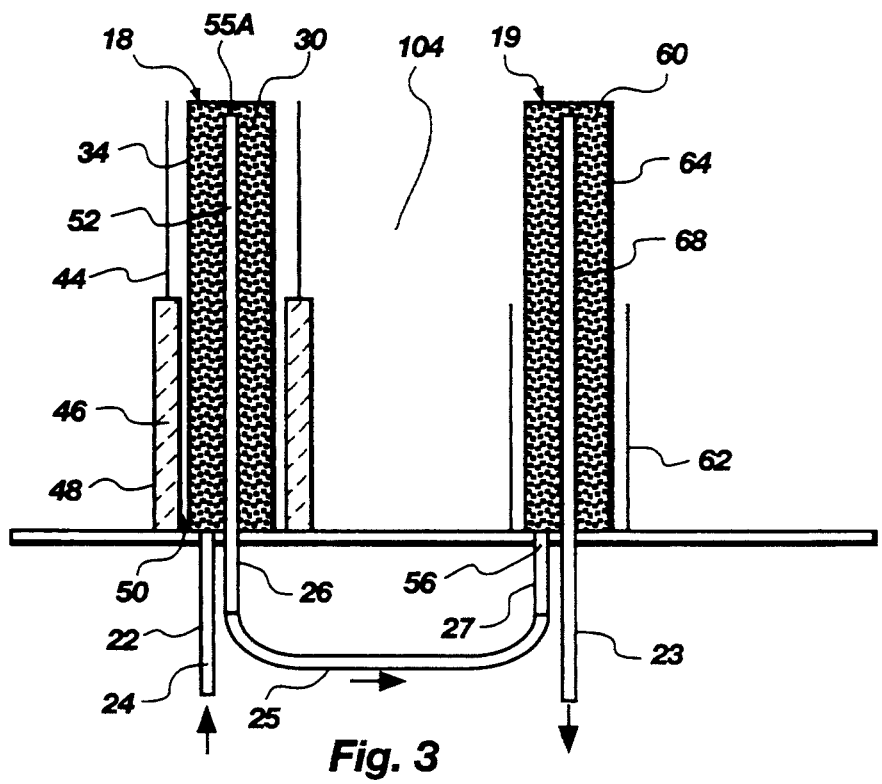
FIG. 3 shows a schematic elevation view of an alternate embodiment of the reformer.

As best seen in FIGS. 1-3, the flow is conducted from the outlet 55 of the packed bed 30 to the inlet 56 of a packed bed 60 of the second reactor 19. The shielding 62 around the container wall 64 of the packed bed 60 limits the radiation heat transfer received by the container wall 64 from the furnace wall 38 and stack 14. The resulting temperature at the container wall 64 is approximately 730 degrees Celsius near the inlet 56.

As the flow passes through the packed bed 60, it continues to crack and reform at increasing temperatures. Approximately halfway along the packed bed 60, the shielding 62 ceases, leaving the container wall 64 fully exposed to the 900 degree environment. The temperature of the container wall 64 at mid-height is approximately 800 degrees Celsius. As the packed bed 60 protrudes into the stack furnace 12 without shielding, the temperature of the container wall 64 at the top end 66 approaches 900 degrees Celsius.

As in the first packed bed 30, the flow passes out of the packed bed 60 through another return pipe 68 which passes back through the entire length 40 of the packed bed 60 to the outlet 23. Along the return pipe 68, which is preferably of the same size and construction as the return pipe 52, the flow exchanges heat with the packed bed 60 contributing to a smooth temperature distribution along the packed bed 60. The feedstock in the flow continues to reform until almost all of the flow is fuel. Reformation efficiencies above 99% are typical. After exiting at the outlet 23, the fuel in the flow is conducted to the fuel cells 16 in the stacks 14.

The airflow and the fuel flow are separated streams in the fuel cell 16 as known in the art of solid oxide fuel cells. The reacted fuel exits the fuel cell 16 into the stack furnace 12 and then passes out the fuel exhaust line 72 to be used for preheating any incoming flows, preferably the incoming air in a separate heat exchanger (not shown).

The product of mass and specific heat is higher for the airflow, so the airflow exits the stack 16 into the stack furnace to heat the stack furnace 12 including the furnace wall 38 and the stack 16. This exhausting gas heats the reformer 10 by effectively forced convection while the furnace wall 38 and stack 16 heat the reformer 10 by radiation.

Figure 5:
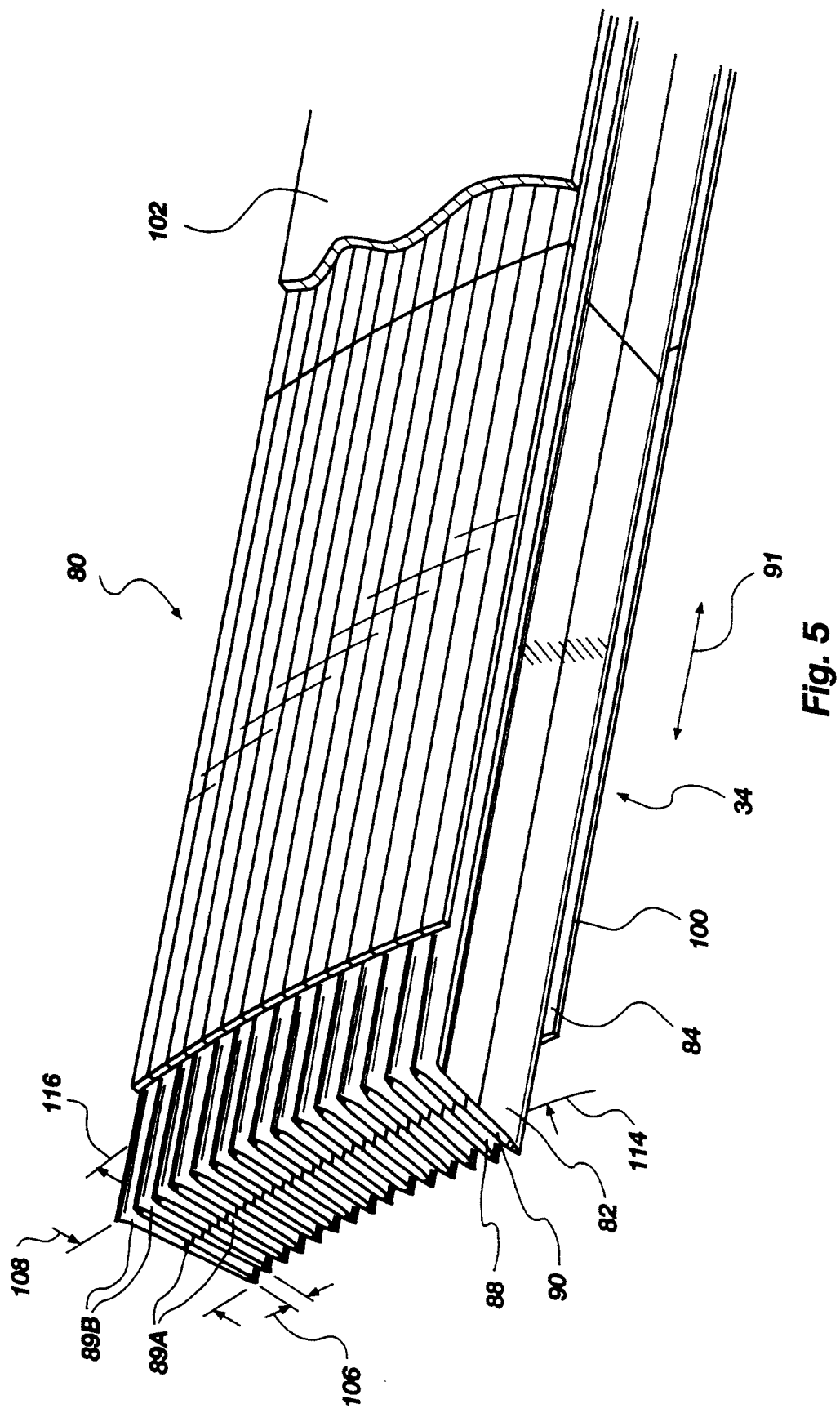
FIG. 5 shows an isometric cutaway view of the heat exchanger installed in the apparatus of FIG. 2.

The exhausted airflows from the plenum of the stack furnace 12 into the heat exchanger 80 of FIGS. 2 and 5. In FIG. 2, the airflows appear to be going in two directions in the heat exchanger 80. However, as shown in FIG. 5, the fin 82 is preferably a continuous corrugated layer of metal, sandwiched between an inner wall 84 and an outer wall 86 which together form two adjacent sets of channels 88, 90 enclosed by the inner wall 84 and outer wall 86, respectively. One side 89A of the corrugated metal fin 82 is exposed to exhausting air while the other side 89B is exposed to incoming air. The intimate association of the two airflows provides preheated air for the fuel cells 16 in the stack 14 while acting as a recuperative counterflow heat exchanger to extract heat from the exhausting air.

Incoming air arrives from the air intake 92, passing through the channels 90, the air induction port 94 and the plenum 96 into the stacks 14. Exiting air leaves the stacks 14, passing over the reformer 10 and exiting through the exhaust port 98 into the channels 88. It will eventually go into the air exhaust line 28. The exiting air has already given up much of its heat to the reformer 10 and continues along the channels 88 to transfer heat across the fin 82 to the incoming air. Meanwhile, the incoming air receives initial heat in the channel 90 across the fin 82 before passing into the plenum 96 on its path to the stacks 14.

Thus, the counterflow effect pervades the preferred embodiment of the invention. For feedstock conduits, which become fuel lines as reformation progresses, and for air conduits, from initial incoming flows to exhausted outgoing flows, the counterflow arrangement described transfers the heat from outgoing flows to incoming flows. The system thus provides energy for reformation by recuperating the energy released by the exothermic chemical reactions and the ohmic losses in the fuel cells 16. Moreover, the thermally integrated reformer 10 efficiently recovers the heat needed to drive its endothermic reformation processes at temperatures throughout which do not promote excessive, premature cracking.

EXAMPLES

Figure 4:
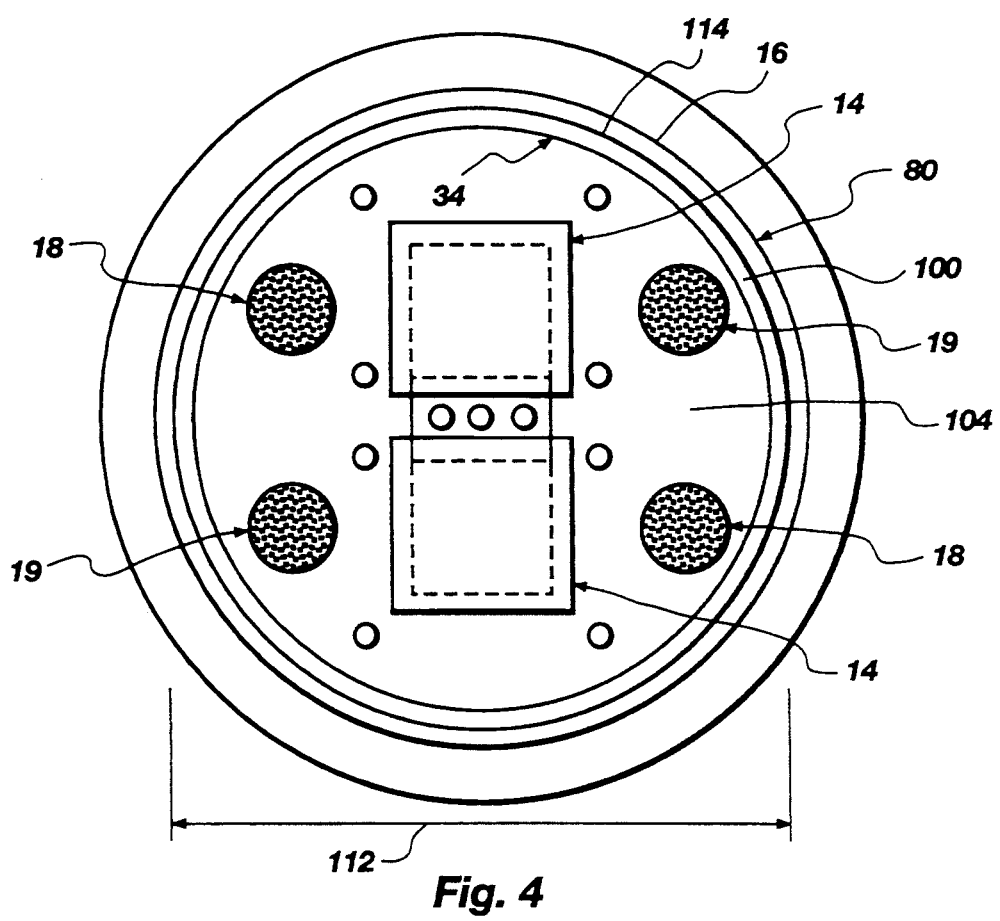
FIG. 4 shows a schematic plan view of two thermally integrated reformers arranged with two rectangular-plate-type stacks of fuel cells.

As illustrated in FIGS. 2 and 4, the apparatus can be constructed as a 2 kW class methane-fueled thermally self-sustaining system. The four main components of such a system are the stacks 14, the enclosure or furnace wall 38 of the stack furnace 12, the fuel reformer-preheater 10, and the air recuperative heat exchanger 80. These components have been combined in an integrated system. The heat exchanger 80 is imbedded in the furnace wall 38 of the stack furnace 12 containing both the fuel cell stacks 14 and the fuel reformer-preheater 10 (reactors 18, 19).

The air heat exchanger 80 is the primary structure of the modular enclosure formed by the furnace wall 34. This is potentially the most costly component of a SOFC system. The high temperature of SOFC operation requires that costly alloys such as INCONEL TM be used in the heat exchanger 80. System efficiency is also affected by the effectiveness of the heat exchanger 80. Air preheat duty is about 4 kW per kW of electrical output. Obviously, if this heat is not recoverable from the exhaust air stream then the maximum system efficiency would be 20% (1 kW out/[1 kW+4 kW] in). The temperature difference available to drive the heat exchanger 80 is the temperature rise (150°-200° C.) of the air as it cools the SOFC stacks.

A large heat transfer surface area or high heat transfer coefficient is necessary to minimize the temperature driving force required by the heat exchange duty. Increasing the heat transfer coefficient generally increases the pressure drop across the heat exchanger 80 which increases pumping costs and sealing difficulty. A large surface area requires greater amounts of the costly, high-temperature alloy.

Figure 6:
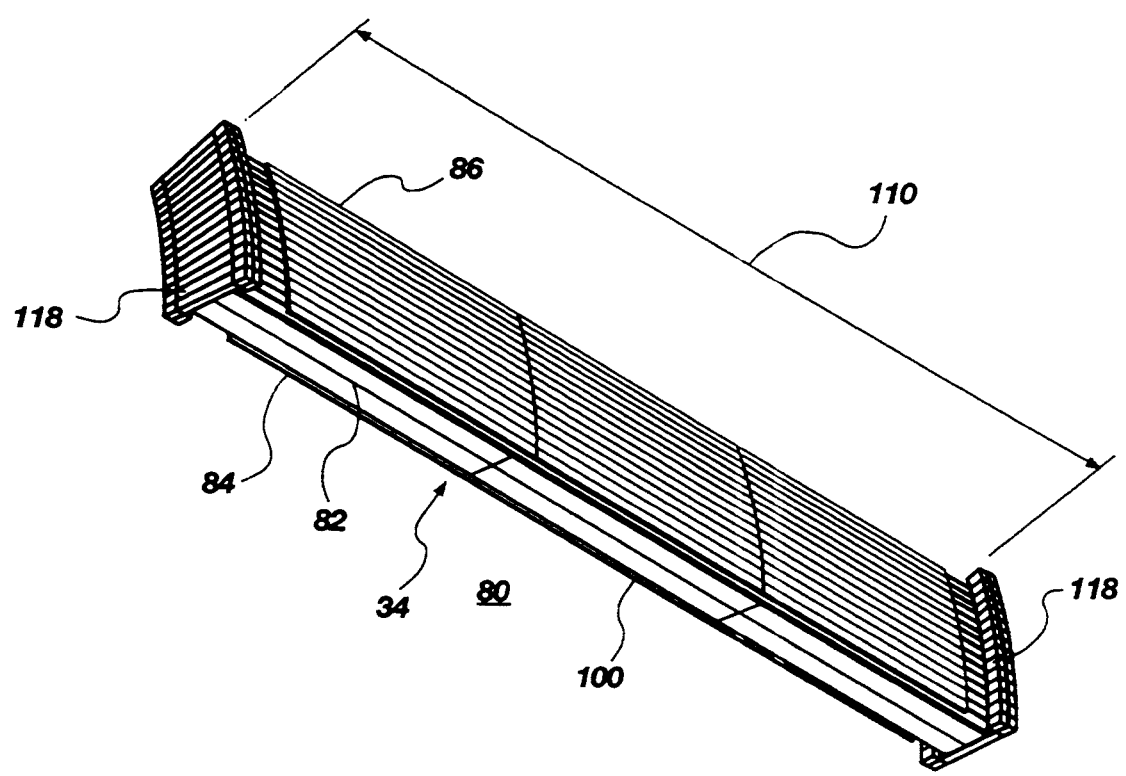
FIGS. 6–7 show isometric views of the heat exchanger of FIG. 5 illustrating the inlet and outlet passages at each end of the exchanger.
Figure 7:
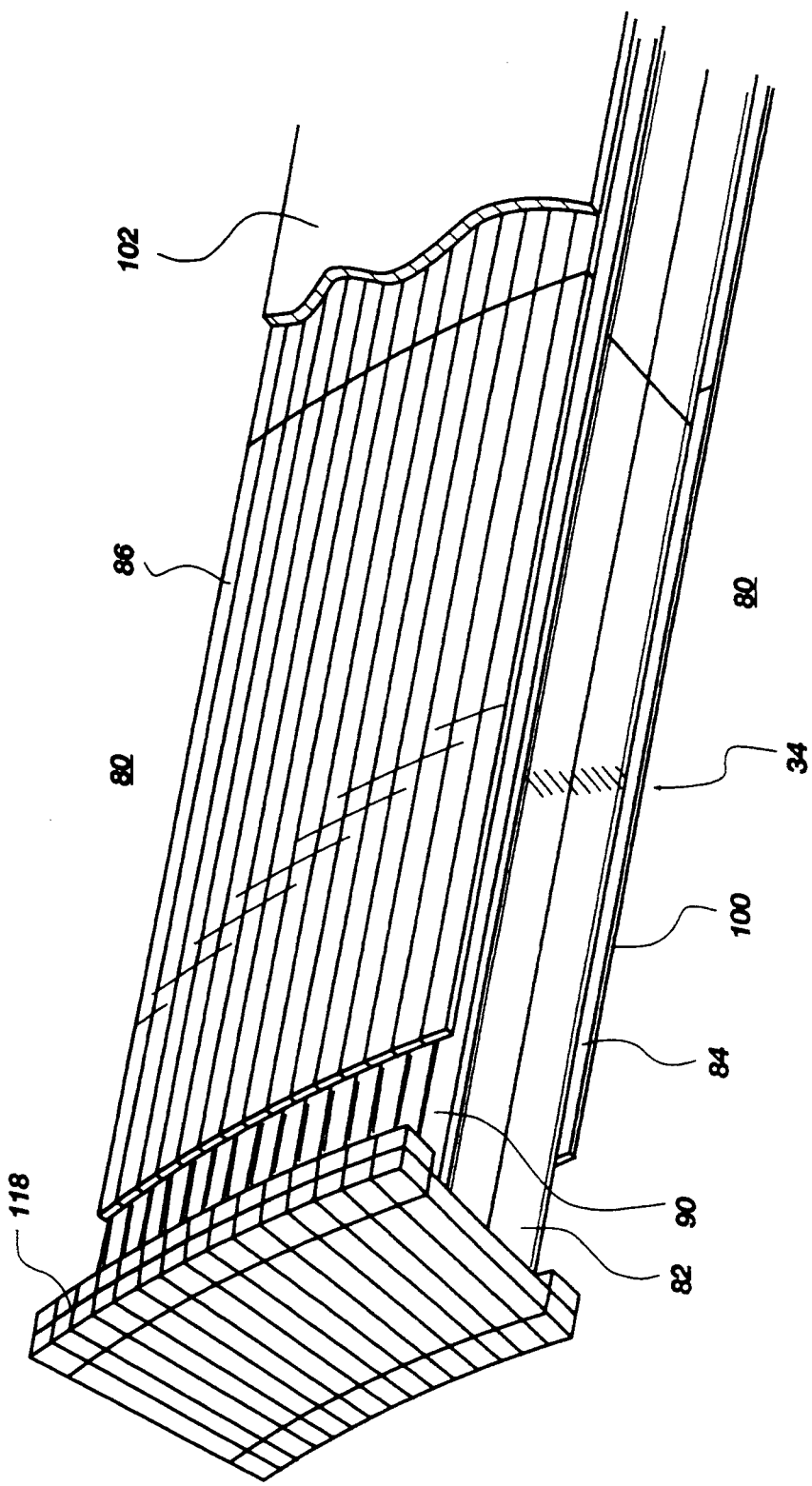

In FIGS. 5–7, a plate fin heat exchanger configuration minimizes the total amount of material per unit of heat exchange area. This configuration employs a corrugated sheet as fin 82, forming the primary heat exchange surfaces, with inner and outer walls 84, 86 formed of smooth sheets for gas containment. The cross section of the heat exchanger 80 appears similar to that of a cardboard box. The heat exchanger 80 is wrapped to be cylindrical, forming or fitting along the furnace wall 38 with the gas flow channels 88, 90 oriented in the resulting cylinder's axial direction 91. Cold fresh airflows downward through the outer channels 90 counter to the hot exhaust air which flows upward through the inner channels 88. The interior or inner wall 84 of the cylindrical heat exchanger 80 forms the volume in which the stacks and reformer 10 (reactors 18, 19) are enclosed. A thin layer of insulation 100 on the inner wall 84 of the heat exchanger 80 limits the heat loss from the plenum 104 of the stack furnace 12 to the cold areas of the heat exchanger 80. Thicker insulation 102 surrounds the exterior of the heat exchanger 80.

In FIGS. 4–6, design parameters for a 5 kW system which would minimize total weight of high temperature alloy in the heat exchanger 80 include fin spacing 106, fin depth 108, cylinder height 110 and diameter 112, heat transfer duty, temperature driving force, and pressure drop. Either Monte Carlo or conjugate gradient optimization methods may be used to determine an optimized design. The optimized system has a height of 0.38 m and a diameter of 0.33 m with a fin height of 2 cm and a fin gap of 2 mm. The calculated combined area of the fin 82 is 4.2 m$^2$ and the area of the two face sheets forming the inner and outer walls 84, 86 totals 5 m$^2$.

The actual dimensions are necessarily changed somewhat to accommodate clearances necessary for fabrication. The inner diameter 112 of the heat exchanger 80 is 39.4-cm to allow for more insulation. "INCONEL TM" sheet 0.46 mm thick and 41 cm wide can be fabricated by Robinson Fin Machines, Inc. into corrugated sheet. The fin depth 108 is 1.9 cm with a fin spacing 106 or pitch of 2.8 mm on the inside circumference 114 and 3.2 mm on the outside circumference 116. The corrugated sheet (fin 82) is attached to end flanges 118 by a powdered metal brazing process. Corrosion perforations in the fin 82 near the brazed locations must be avoided. The flanges 118 should be removed, and any perforated length of fin 82 cut off if this occurs. In actual tests, the final heat exchanger 80 had a height 110 of only 0.36 m for this reason, and an extension accommodated the length discrepancy. Actual core surface area of the fin 82 in the heat exchanger 80 was 3.3 m$^2$.

Thermal tests established performance of the heat exchanger 80. Gas burners were installed in place of the SOFC stacks (columns). Thermocouple readings were taken for combinations of air and fuel flow rates which would simulate operation of a 1-3 kW SOFC. Insulation and sealing materials were added to reduce heat and air losses, bringing observed performance nearer the performance predicted by a no-loss analysis. A 1 kW system operating at 0.6 V per cell and 50% fuel utilization should be thermally self-sustaining. Larger systems should be self-sustaining and yield even higher operating efficiencies.

Reforming external to the stacks, but thermally coupled with the stacks, had improved system performance in previous testing. Risk of carbon formation was also shown to be minimized by tracking the reforming reaction equilibrium composition throughout fuel preheat. The reforming system was designed in accordance with these concepts.

Haldor Topsøe R-67-7H steam reforming catalyst was used in the packed beds 30, 60 of reactors 18, 19 in the reformer 10. This is a supported nickel catalyst in the form of the granules 32, each a cylindrical pellet 16 mm in diameter and 8 mm in height, with 7 holes through the axial direction of the pellet. The rated operating temperature range is 300°-1400° C. for the granules 32. The manufacturer reports that for most applications an approach to equilibrium of less than 10° C. is possible. Reformer operation at steam to carbon ratios below one has been reported.

The container walls 34, 64 of the reactors 18, 19 of the reformer 10 were made from 2 inch schedule 10 INCONEL ™ pipe 30.5 cm long. An approximately 9.5 mm INCONEL ™ tube (inlet 56) feeds the feedstock in a gas phase to the bottom of the catalyst bed. The feedstock flows upward through the bed and exits downward through another 9.5 mm tube (return pipe 52) which penetrates the center of the catalyst bed. Two packed beds 30, 60, inside the container walls 34, 64, were placed in series as shown in FIG. 3 forming each of the two columns or reactors 18, 19. The lower half of the upstream reactor 18, 19 of the reformer 10 was wrapped with kaowool insulation which also acted as a radiation shield (insulated shield 46) in that area. "INCONEL ™" radiation shields 42, 44, were placed on the top half of the first reactor 18 and the lower half of the second reactor 19.

The reforming reaction is generally considered to be limited by the heat transfer rate. However, at lower temperatures, reaction kinetics may be rate-limiting. Extremely high radiant heat fluxes would be expected near the relatively cool reformer inlet 22. High heat fluxes combined with lower reaction rates near the inlet 56 could result in substantial departures from equilibrium and increased risk of carbon formation. The insulated radiation shield 46 and other radiation shields 42, 44 are used to lower the initial heating rate and to provide a low temperature "adiabatic" pre-reformer for the higher hydrocarbons found in natural gas. The ideal temperature rise and reaction rate progression, should be determined by analysis of a kinetic expression. Heat transfer to the reformer core is augmented by countercurrent heat transfer from the exiting reformate (flow predominantly of fuel).

Each reformer has a pair of reactors 18, 19 that can supply a 2.5 kW stack column with a space velocity of 350 hr$^{-1}$ and a reformer pressure drop of 1 m H$_2$O. This space velocity is lower than the 2000 hr$^{-1}$ suggested by manufacturers of SOFC units. Other considerations such as pressure drop, surface to volume ratio of the container 34, 64, diameter ratio of the pellet (granule 32) to the container 34, 64, thermal shielding, and catalyst deactivation allowance were involved in determining the reformer configuration. Even at this low space velocity, the cost of the reforming catalyst is only $8.40/kW. A prototype reformer and desulfurizer were operated for several weeks on pipeline natural gas. A steam to carbon ratio of 1.6 was used and 99.8% conversion of methane was obtained.

The embodiments and examples described herein are illustrative and are not intended to limit in any way the scope of the invention which is limited only by its claims.

What is claimed is:

1. A reformer comprising:
   a reactor bed positioned in the reformer for reforming a feedstock to a fuel;
   an inlet for conducting the feedstock into the reformer;
   a heat exchanger for exchanging heat between a solid oxide fuel cell and the feedstock at a rate proportional to the rate of formation of the fuel; and
   an outlet positioned to receive the fuel from the reactor bed for conducting the fuel to the solid oxide fuel cell.

2. The reformer of claim 1 further comprising a control system for controlling the temperature of the feedstock in the reformer to minimize formation of elemental carbon.

3. The reformer of claim 1 wherein the heat exchanger is positioned within a stack furnace to transfer heat from the stack and a wall of the stack furnace to the reactor bed.

4. The reformer of claim 3 wherein the heat exchanger includes a radiation heat exchanger for transferring heat from the stack by radiation.

5. The reformer of claim 4 wherein the heat exchanger includes a convective heat exchanger for transferring heat by convection.

6. The reformer of claim 5 wherein the heat exchanger includes a forced convection heat exchanger for transferring heat by forced convection.

7. The reformer of claim 4 wherein the heat exchanger further includes a shield for shielding a portion of the reactor bed from radiation.

8. The reformer of claim 7 wherein the shield is graduated for maintaining a thermal gradient along a length of the reactor bed.

9. The reformer of claim 8 wherein the shield is graduated in at least 3 stages.

10. The reformer of claim 8 wherein a flow path for the feedstock passes through the reformer in a counterflow arrangement.

11. The reformer of claim 1 wherein:
    the reactor bed includes catalytic particles for contacting the feedstock; and
    the heat exchanger includes a container surrounding the reactor bed for containing the catalytic particles and for transferring heat to said catalytic particles.

12. The reformer of claim 1 wherein the reformer comprises a plurality of reactor beds connected in series.

13. The reformer of claim 1 wherein the feedstock includes hydrocarbons.

14. The reformer of claim 1 wherein the reactor bed forms a recuperative, counterflow heat exchanger.

15. The reformer of claim 1 wherein the reactor bed is positioned within a stack furnace of the solid oxide fuel cell.

16. An apparatus comprising:
   a fuel cell for generating electricity from oxidizing fuel;
   a stack furnace surrounding the fuel cell for containing the fuel cell; and
   a reformer positioned in the stack furnace to receive heat from the stack furnace for providing fuel to the fuel cell.

17. The apparatus of claim 16 wherein said fuel cell includes:
   a cathode for forming and passing oxygen ions;
   an anode spaced apart from the cathode for reacting hydrogen and carbon monoxide with oxygen ions; and
   a solid oxide electrolyte positioned between and in intimate contact with the anode and the cathode for passing oxygen ions from the cathode to the anode and wherein said reformer comprises a packed bed positioned to receive a feedstock and to receive heat from the stack furnace for reforming the feedstock into fuel.

18. The apparatus of claim 17 wherein the packed bed includes a catalyst for enhancing the reforming of the feedstock.

19. The apparatus of claim 17 wherein the reformer further includes a heat exchanger for exchanging heat between the exhaust and feedstock.

20. The apparatus of claim 19 wherein the heat exchanger is positioned within the stack furnace.

21. The apparatus of claim 19 wherein the exchanging means is a recuperative counterflow heat exchanger.

22. The apparatus of claim 19 wherein the heat exchanger further includes a distributor for graduating the temperature distribution along a length of the packed bed.

23. The apparatus of claim 22 wherein the distributor includes a shield for shielding the packed bed from radiation.

24. The apparatus of claim 17 wherein the feedstock further includes hydrocarbon and water and the fuel further includes carbon monoxide and hydrogen.

25. A method of reforming a feedstock into fuel for use in a solid oxide fuel cell comprising:
   introducing a flow of feedstock into a reactor positioned inside a stack furnace housing a solid oxide fuel cell;
   exposing the reactor to radiation and exhaust from the fuel cell and stack furnace;
   exchanging heat from the fuel cell and stack furnace into the flow of feedstock to form a heated flow;
   reforming the feedstock into fuel;
   exchanging heat from the heated flow at a first location into the heated flow at a second location upstream from the first location; and
   directing the fuel towards the fuel cell.

26. The method according to claim 25, further including:
   establishing a temperature gradient along the length of the reactor by selectively shielding portions of the reactor from radiation heat transfer.

27. The method according to claim 25, further comprising:
   introducing the flow of feedstock into the reactor at a controlled flow rate;
   exposing the feedstock to a catalyst in the reactor; and
   adding heat to the feedstock at a rate proportional to the rate of the flow.

28. The method according to claim 25 wherein: the feedstock includes a mixture of a hydrocarbon and water.

* * * * *